Patented Mar. 2, 1943

2,312,695

UNITED STATES PATENT OFFICE 2,312,695

DIAZINE DERIVATIVES

Gaetano F. D'Alelio, Pittsfield, Mass., assignor to General Electric Company, a corporation of New York No Drawing. Application November 14, 1941, Serial No. 419,177

15 Claims. (Cl. 260—251)

This invention relates to new chemical compounds and more particularly to diazine derivatives. The invention especially is concerned with the production of new and useful bis-(diamino pyrimidyl thio alkylamido) and bis-(diamino pyrimidyl thio alkylthionoamido) derivatives of divalent hydrocarbons.

The diazine derivatives of this invention may be represented graphically by the following general formula:

I

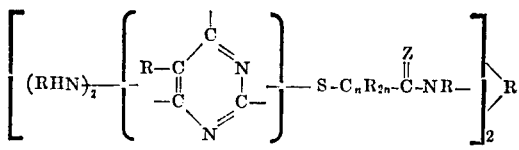

In the above formula $n$ represents an integer and is at least 1 and not more than 2, Z represents a member of the class consisting of oxygen and sulfur, R represents a member of the class consisting of hydrogen and monovalent hydrocarbon and substituted hydrocarbon radicals, more particularly halo-hydrocarbon radicals, and R' represents a member of the class consisting of divalent hydrocarbon and substituted hydrocarbon radicals, more particularly halo-hydrocarbon radicals. Since $n$ represents an integer which is 1 or 2, it will be seen that the linkage of the sulfur atom to the carbamyl-alkyl or thionocarbamyl-alkyl grouping in all cases will be alpha or beta to the carbamyl or thionocarbamyl grouping. It also will be observed that the amino (—NHR) groups and the sulfur atom are attached directly to a carbon atom of the pyrimidine nucleus.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylpropyl, cinnamyl, etc.); and their homologues, as well as those groups with one or more of their hydrogen atoms substituted by, for example, a halogen. Preferably R in Formula I is hydrogen. However, there also may be produced in accordance with the present invention chemical compounds such, for instance, as those represented by the general formulas:

II

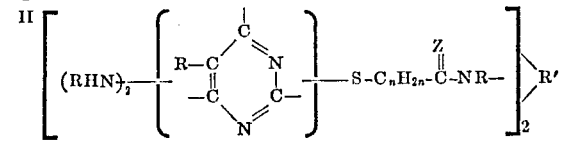

and, more particularly,

III

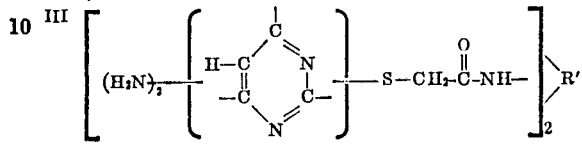

where $n$, Z, R and R' have the same meanings as given above with particular reference to Formula I.

Illustrative examples of divalent radicals that R' in the above formulas may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cycloheptylene, etc.; divalent aliphatic-substituted aromatic, e. g., 2,4-tolylene, ethyl 2,5-phenylene, isopropyl 3,4-phenylene, 1-butyl, 2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aromatic-substituted aliphatic or divalent aliphatic-substituted aromatic, e. g., 4, alpha-tolylene, 3, beta-phenyleneethyl, 4, alpha-xylylene, 2, gamma-phenylenebutyl, etc.; and their homologues, as well as those divalent radicals with one or more of their hydrogen atoms replaced by a substituent, e. g., halogeno, amino, acetyl, acetoxy, carboalkoxy, alkoxy, aryloxy, hydroxy, alkyl, alkenyl, etc. Specific examples of substituted divalent radicals are chloroethylene, chloropropylene, bromobutylene, chlorophenylene chlorotolylene bromophenylene, chloronaphthylene, bromonaphthylene, bromo 1,4-tolylene, chlorocyclopentylene, chloropentenylene, carbomethoxyphenylene, ethoxyphenylene, acetophenylene, acetoxyphenylene, bromocyclopentylene, aminophenylene, phenoxyphenylene, methylphenylene (tolylene), allylphenylene, etc. Preferably R' is ethylene, phenylene or tolylene.

The new compounds of this invention may be used as chemotherapeutic agents and as intermediates in the preparation of other compounds. For example, they may be employed in the preparation of ureido, hydrazino, methylol, carbamyl, amidine, etc., derivatives of the diazine compound. These new organic compounds are especially valuable in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and claimed in my copending application Serial No. 419,178, filed Nov. 14, 1941, and assigned to the same assignee as the present invention. These new chemical compounds also may be incorporated into rubber, both natural and synthetic, to modify the properties of the rubber.

More specific examples of the chemical compounds of this invention are the bis-(diamino pyrimidyl thio acetamido)-substituted aliphatic hydrocarbons, more particularly the bis-(diamino pyrimidyl thio acetamido) alkanes, e. g., alpha, beta-bis-(4,6-diamino pyrimidyl-2 thio acetamido) ethane, alpha, beta-bis-(2,4-diamino pyrimidyl-6 thio acetamido) ethane, the bis-(diamino pyrimidyl thio acetamido) propanes, etc., and the bis-(diamino pyrimidyl thio acetamido)-substituted aromatic hydrocarbons, e. g., the bis-(diamino pyrimidyl thio acetamido) benzenes, the bis-(diamino pyrimidyl thio acetamido) toluenes, etc.

Various methods may be employed to produce the chemical compounds with which this invention is concerned. I prefer to prepare them by effecting reaction between a bis-(halogeno alkylamido)-substituted divalent hydrocarbon or a bis-(halogeno alkylthionoamido)-substituted divalent hydrocarbon and a mercapto diamino pyrimidine in the presence of a hydrohalide acceptor, the reactants being employed in the ratio of at least two mols of the mercapto diamino pyrimidine for each mol of the said substituted divalent hydrocarbon.

Illustrative examples of bis-(halogeno alkylamido) and bis-(halogeno alkylthionoamido) substituted divalent hydrocarbons that may be used, depending on the end-product desired, are:

Bis-(chloroacetamido) ethane, more particularly alpha, beta-bis-(chloroacetamido) ethane
Bis-(chloroacetothionoamido) ethane, more particularly alpha, beta-bis-(chloroacetothionoamido) ethane
Bis-(chloroacetamido) propanes
Bis-(chloroacetothionoamido) propanes
Bis-(chloroacetamido) butanes
Bis-(chloroacetamido) pentanes
Bis-(chloroacetamido) benzenes
Bis-(chloroacetamido) toluenes
Bis-(chloroacetamido) xylenes
Bis-(chloroacetamido) naphthalenes
Bis-(chloroacetamido) octanes
Bis-(beta-chloropropanamido) propanes
Bis-(N-methyl alpha-bromopropanamido) propenes
Bis-(beta-iodopropanamido) butanes
Bis-(alpha-methyl beta-chloro N-isopropyl propanamido) chloroisobutanes
Bis-(alpha-butyl beta-bromo N-ethyl propanamido) pentanes
Bis-(alpha-phenyl beta-chloro octanamido) isopentanes
Bis-(beta-chlorophenyl beta-bromo N-cyclopentyl butanthionoamido) cyclopentanes
Bis-(alpha, alpha-ditolyl beta-chloro propanamido) cyclopentanes
Bis-(alpha-xylyl alpha-bromo N-phenyl butanamido) cyclohexanes
Bis-(alpha-chlorotolyl alpha-methyl beta-chloro pentanamido) chlorocyclohexenes
Bis-(N-tolyl chloroacetothionoamido) cycloheptanes
Bis-(beta-bromopropanamido) benzenes
Bis-(beta-chloro N-benzyl 4-pentenamido) biphenyls
Bis-(bromocyclopentyl chloro N-naphthyl acetamido) naphthalenes
Bis-(bromoacetamido) ethane, more particularly alpha, beta-bis-(bromoacetamido) ethane
2,4-bis-(cyclohexenyl bromo acetothionoamido) chlorotoluene
2,5 - bis-(beta - phenyl alpha - chloro N - chlorophenyl propanamido) ethylbenzene
3,4-bis-(beta-bromopropanamido) propylbenzene
4,4' - bis - (N - bromoethyl chloroacetamido) diphenylmethane
Alpha, gamma - bis -(N - xenyl chloroacetamido) phenylpropane
Alpha, alpha' - bis - (beta - chloroheptanthionoamido) xylene
2,4-(cyclopentenyl chloro N-aminophenyl acetamido) 1-isobutyl naphthalene
Alpha, beta-bis-(omega-chloro alpha-bromo N-butylphenyl pentanamido) phenylethane
Bis-(bromoacetamido) propanes
Bis-(bromoacetamido) butanes
Bis-(bromoacetamido) benzenes
Bis-(bromoacetamido) toluenes Illustrative examples of diamino mercapto pyrimidines that may be employed, depending upon the particular end-product sought, are:

2-mercapto 4,6-diamino pyrimidine
4-mercapto 2,6-diamino pyrimidine
2-mercapto 4-bromotoluido 6-benzylamido pyrimidine
2-toluido 4-mercapto 6-methylamino pyrimidine
2-mercapto 4-phenylchloroethylamino 6-phenethylamino pyrimidine
2-mercapto 4-chloroanilino 6-ethylphenylamino pyrimidine
2-mercapto 4-cycloheptylamino 6-isopropylamino pyrimidine
2-mercapto 4,6-diamino 5-methyl pyrimidine
4-mercapto 2,6-diamino 5-methyl pyrimidine
2-mercapto 4,6-di-(methylamino) pyrimidine
4-mercapto 2,6-di-(methylamino) pyrimidine
2-mercapto 4,6-di-(methylamino) 5-methyl pyrimidine
4-mercapto 2,6-di-(methylamino) 5-phenyl pyrimidine
2-mercapto 4-chloroethylamino 6-methylamino pyrimidine
2-mercapto, 4,6-di-(anilino) pyrimidine
2-mercapto 4,6-di-(anilino) 5-butyl pyrimidine
2-mercapto 4-xenylamino 5-cyclopentyl 6-amylamino pyrimidine
2-toluido 4-mercapto 5-cyclohexenyl 6-amino pyrimidine (2-toluido 4-amino 5-cyclohexenyl 6-mercapto pyrimidine)
2-mercapto 4-amino 6-ethylamino pyrimidine
2-mercapto 4,6-di-(propylamino) pyrimidine
2-allylamino 4-mercapto 6-chlorophenylamino pyrimidine
2-amylamino 4-mercapto 5-phenyl 6-amino pyrimidine
2-dichloroanilino 4-mercapto 5-tolyl 6-propylamino pyrimidine
2-cycloheptylamino 4-mercapto 6-isobutylamino pyrimidine
2-mercapto 4-allylamino 6-butylamino pyrimidine
2-mercapto 4-(3' - butenylamino) 6 - isopropylamino pyrimidine 2-mercapto 4-isobutylamino 6-cyclopentylamino pyrimidine
2-mercapto 4-amino 6-chloroxenylamino pyrimidine

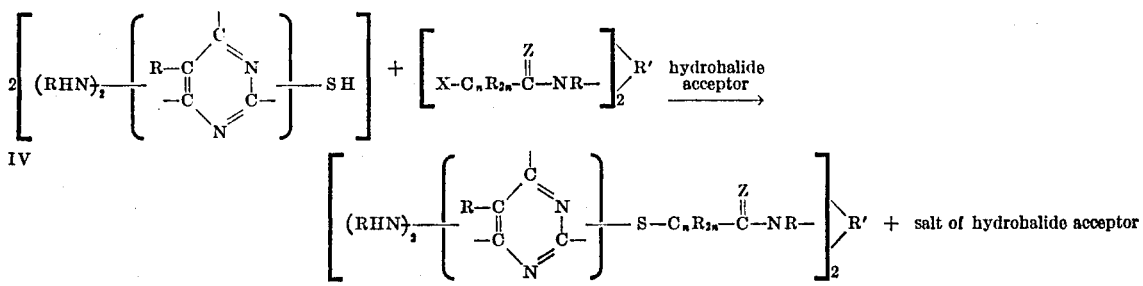

2-mercapto 4-ethylphenylamino 5-naphthyl 6-xylidino pyrimidine
2-mercapto 4-isopropylanilino 5-benzyl 6-benzylamino pyrimidine
2-mercapto 4-phenethylamino 5-(2'-butenyl) 6-cyclopentenylamino pyrimidine
2-mercapto 4,6-diamino 5-bromotolyl pyrimidine
2-mercapto 4-amino 5-phenylisopropyl 6-chlorocyclohexylamino pyrimidine
2-mercapto 4-isobutylamino 6-bromonaphthylamino pyrimidine
2-mercapto 4,6-diamino 5-phenylpropyl pyrimidine
2-mercapto 4-chlorobenzylamino 5-chlorobutyl 6-bromoethylamino pyrimidine
2-mercapto 4-amino 5-ethylchlorophenyl 6-sec.-butylamino pyrimidine
2-mercapto 4-pentylamino 6-cyclohexylamino pyrimidine
2-mercapto 4-n-hexylamino 6-xenylamino pyrimidine
2-mercapto 4-cyclohexenylamino 6-naphthylamino pyrimidine
2-mercapto 4-amino 6-bromoethylamino pyrimidine
2-mercapto 4-amino 6-methylamino pyrimidine
2-mercapto 4-aminoanilino 6-ethylphenylamino pyrimidine
2-mercapto 4-amino 6-benzylamino pyrimidine
2-mercapto 4-chlorocyclopentylamino 6-toluido pyrimidine Various hydrohalide acceptors may be employed. I prefer to use a hydrohalide acceptor that will react with the mercapto pyrimidine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the bis-(halogeno alkylamido) or bis-(halogeno alkylthionoamindo) substituted divalent hydrocarbon may be carried out in any suitable manner, but preferably is effected in the presence of a suitable solvent or mixture of solvents. Although various solvents and solvent mixtures may be employed, I prefer to use water or a mixture of water and alcohol. The reaction may be carried out under a variety of temperature and pressure conditions, for instance at normal or at elevated temperatures and at atmospheric, sub-atmospheric or super-atmospheric pressures.

The above reaction may be represented by the following general equation:

In the above equation X represents halogen (e. g., chlorine, bromine, iodine) and $n$, $Z$, $R$ and $R'$ have the same meanings as given above with reference to Formula I.

The new chemical compounds of this invention also may be prepared by effecting reaction between a halogenated diamino pyrimidine and a bis-(mercapto alkylamido) or bis-(mercapto alkylthionoamido) substituted divalent hydrocarbon in the presence of a hydrohalide acceptor. The reaction may be carried out by any suitable means but preferably is effected in the presence of an anhydrous solvent, e. g., alcohol. An anhydrous solvent is desirable because one of the reactants, namely, the halogenated pyrimidine, is hydrolyzable. The other conditions of reaction may be the same as described above with reference to the first-mentioned method of preparation.

Illustrative examples of bis-(mercapto alkylamido) and bis-(mercapto alkylthionoamido) substituted divalent hydrocarbons that may be used, depending on the end-product desired, are:

Bis-(mercaptoacetamido) ethane, more particularly alpha, beta - bis - (mercaptoacetamido) ethane
Bis-(mercaptoacetothionoamido) ethane, more particularly alpha, beta-bis-(mercaptoacetothionoamido) ethane
Bis-(mercaptoacetamido) propanes
Bis-(mercaptoacetothionoamida) propanes
Bis-(mercaptoacetamido) butanes
Bis-(mercaptoacetamido) pentanes
Bis-(mercaptoacetamido) benzenes
Bis-(mercaptoacetamido) toluenes
Bis-(mercaptoacetamido) xylenes
Bis-(mercaptoacetamido) naphthalenes
Bis-(mercaptoacetamido) octanes
Bis-(beta-mercaptopropanamido) propanes
Bis - (N - methyl alpha - mercaptopropanamido) propenes
Bis-(beta-mercaptopropanamido) butanes
Bis-(alpha-phenyl beta-mercapto N-isopropyl propanamido) chloroisobutanes
Bis-(alpha-butyl beta-mercapto N-ethyl propanamido) pentanes
Bis-(alpha-phenyl beta-mercapto octanamido) isopentanes
Bis-(alpha-xylyl alpha-mercapto N-phenyl butanamido) cyclohexanes
Bis-(beta-chlorophenyl beta-mercapto N-cyclopentyl butanthionoamido) cyclopentanes
Bis-(alpha, alpha-ditolyl beta-mercapto propanamido) cyclopentenes
Bis-(alpha-chlorotolyl alpha-methyl beta-mercapto isopentanamido) chlorohexenes
Bis-(N-tolyl mercaptoacetothionoamido) cycloheptanes Bis-(beta-mercaptopropanamido) benzenes
Bis-(beta-mercapto N-benzyl 4-pentenamido) biphenyls
Bis-(bromocyclopentyl mercapto N-naphthyl actamido) naphthalenes
2,4 - bis - (cyclohexenyl mercaptoacetothionoamido) chlorotoluene
2,5-bis-(alpha-mercapto beta-phenyl N-chlorophenyl propanamido) ethylbenzene
3,4-bis-(beta-mercaptopropanamido) propylbenzene
4,4'-bis-(N-bromoethyl mercaptoacetamido) diphenylmethane
2,4-bis-(cyclopentenyl mercapto N-aminophenyl acetamido) 1-isobutyl naphthalene
Alpha, beta-bis-(alpha-mercapto omega-chloro N-butylphenyl pentanamido) phenylethane
Alpha, gamma-bis-(N-xenyl mercaptoacetamido) phenylpropane
Alpha, alpha'-bis-(beta-mercapto heptanthionoamido) xylene Illustrative examples of halogenated diamino pyrimidines that may be used, depending on the end-product desired, are:

2-chloro 4,6-diamino pyrimidine
4-chloro 2,6-diamino pyrimidine
2-chloro 4,6-di-(methylamino) pyrimidine
2-chloro 4,6-di-(anilino) pyrimidine
2-bromo 4-amino 6-ethylamino pyrimidine
2-chloro 4,6-di-(propylamino) pyrimidine
2-bromo 4,6-di-(methylamino) 5-methyl pyrimidine
2-chloro 4-methylamino 6-chloroethylamino pyrimidine
4-chloro 2-methylamino 6-ethylamino pyrimidine
2-iodo 4,6-di-(anilino) 5-butyl pyrimidine
2-bromo 4-allylamino 6-butylamino pyrimidine
2-chloro 4-isobutylamino 6-cyclopentylamino pyrimidine
2-chloro 4-(3'-butenylamino) 6-isopropylamino pyrimidine
2-chloro 4-bromotoluido 6-benzylamino pyrimidine
2-toluido 4-bromo 6-methylamino pyrimidine
2-bromo 4-phenylchloroethylamino 6-phenethylamino pyrimidine
2-chloro 4,6-diamino 5-methyl pyrimidine
4-chloro 2,6-diamino 5-methyl pyrimidine
2-bromo 4,6-di-(anilino) pyrimidine
2-chloro 4,6-di-(anilino) 5-methyl pyrimidine
2-bromo 4,6-di-(methylamino) 5-phenyl pyrimidine
2-iodo 4,6-diamino pyrimidine
2-bromo 4,6-diamino 5-methyl pyrimidine
2-chloro 4,6-di-(methylamino) 5-phenyl pyrimidine
2-iodo 4,6-di-(ethylamino) 5-naphthyl pyrimidine
2-chloro 4,6-diamino 5-chlorophenyl pyrimidine
2-bromo 4,6-di-(chloroethylamino) pyrimidine
2-chloro 4,6-di-(chlorophenylamino) 5-methyl pyrimidine
2-chloro 4,6-diamino 5-cyclopentyl pyrimidine
2-bromo 4,6-diamino 5-chloronaphthyl pyrimidine
2-chloro 4,6-di-(chloroxenylamino) pyrimidine
2-chloro 4,6-di-(chlorophenylamino) pyrimidine
2-chloro 4-amylamino 6-cyclohexylamino pyrimidine
2-chloro 4-amylamino 5-cyclopentyl 6-xenylamino pyrimidine
2-chloro 4-amylamino 5-cyclopentyl 6-xenylidine (2-toluido 4-amino 5-cyclohexenyl 6-bromo pyrimidine)
2-allylamino 4-chloro 5-phenyl 6-amino pyrimidine
2-isoamylamino 4-chloro 6-chlorophenylamino pyrimidine
2-chloro 4-amylamino 6-cyclohexylamino pyrimidine
2-chloro 4-n-hexylamino 6-xenylamino pyrimidine
2-bromo 4-cyclohexenylamino 5-chlorocyclohexenyl 6-naphthylamino pyrimidine
2-chloro 4-chlorocyclopentylamino 6-toluido pyrimidine
2-dichloroanilino 4-chloro 5-tolyl 6-propylamino pyrimidine
2-chloro 4-amino 6-chloroxenylamino pyrimidine
2-chloro 4-ethylphenylamino 5-naphthyl 6-xylidino pyrimidine
2-chloro 4-isopropylanilino 5-benzyl 6-benzylamino pyrimidine
2-bromo 4-phenethylamino 5-(2'-butenyl) 6-cyclopentenylamino pyrimidine
2-chloro 4,6-diamino 5-bromotolyl pyrimidine
2-bromo 4-amino 5-phenylisopropyl 6-chlorocyclohexylamino pyrimidine
2-chloro 4-bromonaphthylamino 6-isobutylamino pyrimidine
2-chloro 4,6-diamino 5-phenylpropyl pyrimidine
2-chloro 4-bromoethylamino 5-chlorobutyl 6-chlorobenzylamino pyrimidine
2-chloro 4-amino 5-chloroethylphenyl 6-sec.-butylamino pyrimidine
2-iodo 4-amino 6-bromoethylamino pyrimidine
2-bromo 4-dichloroanilino 6-chloroethylamino pyramidine
2-bromo 4-bromotoluido 6-benzylamino pyrimidine
2-chloro 4-aminoanilino 6-ethylamino pyrimidine
2-chloro 4-phenylchloroethylamino 6-phenethylamino pyrimidine
2-chloro 4-chlorocycloheptylamino 6-isopropylamino pyrimidine
2-chloro 4-isopropylanilino 6-phenylpropylamino pyrimidine The hydrohalide acceptor may be the same as described above with reference to the first-named method of preparing the compounds of this invention.

The general reaction for this alternative method of preparing my new chemical compounds is illustrated by the following equation:

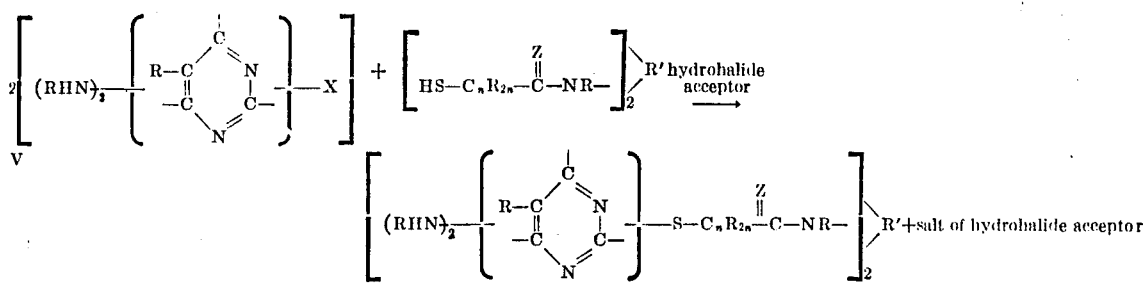

In the above equation X represents halogen (e. g., chlorine, bromine, iodine) and $n$, Z, R and R' have the same meanings as given above with reference to Formula I.

In order that those skilled in the art better may understand how the present invention may be carried into effect, the following illustrative examples are given. All parts are by weight.

*Example 1*

This example illustrates the preparation of alpha, beta-bis-(4,6-diamino pyrimidyl-2 thio acetamido) ethane, the formula for which is VI 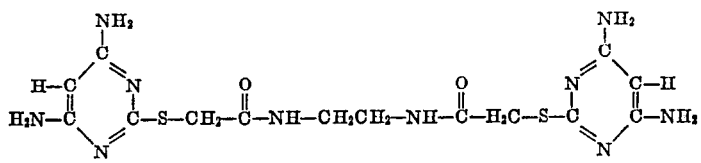

| | Parts | Approximate mol ratio |
|---|---|---|
| 2-mercapto 4,6-diamino pyrimidine | 163.0 | 2 |
| Alpha, beta-bis-(chloroacetamido) ethane | 123.5 | 1 |
| Sodium hydroxide | 46.0 | |

The 2-mercapto 4,6-diamino pyrimidine was dissolved in a solution of the sodium hydroxide in 1,000 parts water. The bis-(chloroacetamido) ethane, which had been partly dissolved in 2,000 parts ethyl alcohol, was added to the solution of the 2-mercapto 4,6-diamino pyrimidine, yielding a clear solution that thereupon was heated on a steam plate for 40 minutes. During this period a precipitate formed. The reaction mass thereafter was allowed to stand for 1 hour at about 0° C. The precipitate comprising impure alpha, beta-bis-(4,6-diamino pyrimidyl-2 thio acetamido) ethane was filtered off, washed free of soluble salts and dried at 70° C. The dried product had a melting point of 189° to 192° C. A Kjeldahl nitrogen analysis of this material checked, within the limits of experimental error, with the theoretical nitrogen content of alpha, beta-bis-(4,6-diamino pyrimidyl-2 thio acetamido) ethane.

*Example 2*

Alpha, beta-bis-(2,6-diamino pyrimidyl-4 thio acetamido) ethane is produced in essentially the same manner as described under Example 1 with the exception that instead of 2-mercapto 4,6-diamino pyrimidine, there is used 163 parts of 4-mercapto 2,6-diamino pyrimidine.

*Example 3*

Alpha, beta-bis-(4,6-diamino pyrimidyl-2 thio acetothionoamido) ethane is produced in essentially the same manner as described under Example 1 with the exception that, instead of alpha, beta-bis-(chloroacetamido) ethane, an equivalent amount of alpha, beta-bis-(chloroacetothionoamido) ethane is employed.

*Example 4*

A bis-(4,6-diamino pyrimidyl-2 thio acetamido) benzene is produced in essentially the same manner as described under Example 1 with the exception that, instead of alpha, beta-bis-(chloroacetamido) ethane, an equivalent amount of a bis-(chloroacetamido) benzene is used.

*Example 5*

A bis-(4,6-diamino pyrimidyl-2 thio acetamido) toluene is produced in essentially the same manner as described under Example 1 with the exception that, instead of alpha, beta-bis-(chloroacetamido) ethane, an equivalent amount of a bis-(chloroacetamido) toluene is used.

Other examples of the new chemical compounds of this invention are listed below:

Bis-(diamino pyrimidyl thio acetamido) propanes, including the bis-(4,6-diamino pyrimidyl-2 thio acetamido) propanes and the bis-(2,6-diamino pyrimidyl-4 thio acetamido) propanes Bis-(diamino pyrimidyl thio acetothionoamido) propanes, including the bis-(4,6-diamino pyrimidyl-2 thio acetothionoamido) propanes and the bis-(2,6-diamino pyrimidyl-4 thio acetothionoamido) propanes Bis-(diamino pyrimidyl thio acetamido) butanes
Bis-(diamino pyrimidyl thio acetamido) pentanes
Bis-(diamino pyrimidyl thio acetamido) benzenes
Bis-(diamino pyrimidyl thio acetamido) toluenes
Bis-(diamino pyrimidyl thio acetamido) xylenes
Bis-(diamino pyrimidyl thio acetamido) naphthalenes
Bis-(diamino pyrimidyl thio acetamido) chlorobenzenes
Bis-(diamino pyrimidyl thio acetamido) octanes
Bis-(diamino pyrimidyl thio acetamido) chloronaphthalenes
Bis-(diamino pyrimidyl thio acetamido) chlorobutanes
Bis-(diamino pyrimidyl thio acetamido) ethylbenzenes Alpha, beta-bis-(diamino pyrimidyl alpha-thio propanamido) ethanes, including alpha, beta-bis-(4,6-diamino pyrimidyl-2 alpha-thio propanamido) ethane and alpha, beta-bis-(2,6-diamino pyrimidyl-4 alpha-thio propanamido) ethane Alpha, beta-bis-(diamino pyrimidyl beta-thio propanamido) ethanes, including alpha, beta-bis-(4,6-diamino pyrimidyl-2 beta-thio propanamido) ethane and alpha, beta-bis-(2,6-diamino pyrimidyl-4 beta-thio propanamido) ethane Alpha, beta-bis-(diamino pyrimidyl alpha-thio propanthionoamido) ethanes, including alpha, beta-bis-(4,6-diamino pyrimidyl-2 alpha-thio propanthionoamido) ethane and alpha, beta-bis-(2,6-diamino pyrimidyl-4 alpha-thio propanthionoamido) ethane Alpha, beta-bis-(diamino pyrimidyl beta-thio propanthionoamido) ethanes, including alpha, beta-bis-(2,6-diamino pyrimidyl-4 beta-thio propanthionoamido) ethane and alpha, beta-bis-(4,6-diamino pyrimidyl-2 beta-thio propanthionoamido) ethane Bis-(diamino pyrimidyl alpha-thio propanamido) propanes
Bis-(diamino pyrimidyl beta-thio propanamido) propanes
Bis-(diamino pyrimidyl alpha-thio propanamido) butanes
Bis-(diamino pyrimidyl beta-thio propanamido) butanes Bis-(diamino pyrimidyl alpha-thio propanamido) pentanes
Bis-(diamino pyrimidyl beta-thio propanamido) pentanes
Bis-(diamino pyrimidyl alpha-thio propanamido) benzenes
Bis-(diamino pyrimidyl beta-thio propanamido) benzenes
Bis-(diamino pyrimidyl alpha-thio propanamido) toluenes
Bis-(diamino pyrimidyl beta-thio propanamido) toluenes
Bis-(diamino pyrimidyl alpha-thio propanamido) xylenes
Bis-(diamino pyrimidyl beta-thio propanamido) xylenes
Bis-(diamino pyrimidyl alpha-thio propanamido) ethylbenzenes
Bis-(diamino pyrimidyl beta-thio propanamido) ethylbenzenes
Bis-(diamino pyrimidyl alpha-thio propanamido) naphthalenes
Bis-(diamino pyrimidyl alpha-thio propanamido) chloronaphthalenes
Bis-(diamino pyrimidyl beta-thio propanamido) naphthalenes
Bis-(diamino pyrimidyl beta-thio propanamido) chloronaphthalenes
Bis-(diamino pyrimidyl alpha-thio propanamido) chlorobenzenes
Bis-(diamino pyrimidyl beta-thio propanamido) chlorobenzenes
Bis-(diamino pyrimidyl alpha-thio propanamido) octanes
Bis-(diamino pyrimidyl beta-thio propanamido) octanes
Bis-(diamino pyrimidyl alpha-thio propanamido) chlorobutanes
Bis-(diamino pyrimidyl beta-thio propanamido) chlorobutanes
Bis-(diamino pyrimidyl alpha-thio propanthionoamido) benzenes
Bis-(diamino pyrimidyl beta-thio propanthionoamido) benzenes
Bis-(diamino pyrimidyl alpha-thio propanthionoamido) toluenes
Bis-(diamino pyrimidyl beta-thio propanthionoamido) toluenes
Alpha, gamma-bis-[4,6-di-(methylamino) 5-methyl pyrimidyl-2 beta'-thio propanamido] propane
Alpha, gamma-bis-(4-chloroethylamino 6-methylamino pyrimidyl-2 thio methyl N-methyl acetamido) propene
Bis-[4,6-di-(anilino) 5-butyl pyrimidyl-2 beta-thio propanamido] butanes
Bis-(4-xenylamino 5-cyclopentyl 6-pentylamino pyrimidyl-2 beta-thio alpha-methyl N-isopropyl propanamido) chloroisobutanes
Bis-(2-toluido 4-amino 5-cyclohexenyl pyrimidyl-6 beta-thio alpha-butyl N-ethyl propanamido) pentanes
Bis-(2-allylamino 4-amino 5-phenyl pyrimidyl-6 beta-thio alpha-phenyl beta-isopentyl propanamido) isopentanes
Bis-(2-isopentylamino 4-chlorophenylamino pyrimidyl-6 beta-thio beta-methyl beta-chlorophenyl N-cyclopentyl propanthionoamido) cyclopentanes
Bis-(2-dichloroanilino 4-propylamino 5-tolyl pyrimidyl-6 beta-thio alpha, alpha-ditolyl propanamido) cyclopentenes
Bis-(4-chloroxenylamino 6-amino pyrimidyl-2 thio ethyl xylyl N-phenyl acetamido) cyclohexanes
Bis-(4-xylidino 5-naphthyl 6-ethylanilino pyrimidyl-2 beta-thio alpha, beta, beta-trimethyl alpha-chlorotolyl propanamido) chlorocyclohexenes
Bis-(4-benzylamino 5-benzyl 6-isopropylanilino pyrimidyl-2 thio N-tolyl acetothionoamido) cycloheptanes
Bis-(4-isobutylamino 6-cycloheptylamino pyrimidyl-2 beta-thio propanamido) benzenes
4,4'-bis-[4''-cyclopentenylamino 5''-(2-butenyl) 6''-phenethylamino pyrimidyl-2'' beta-thio beta-vinyl N-benzyl propanamido] biphenyl
Bis-(4,6-diamino 5-bromotolyl pyrimidyl-2 thio bromocyclopentyl N-naphthyl acetamido) naphthalenes
2,4-bis-(4'-chlorocyclohexylamino 5'-phenylisopropyl 6'-amino pyrimidyl-2' thio cyclopentyl acetothionoamido) chlorotoluene
2,5-bis-(4'-isobutylamino 6'-bromonaphthylamino pyrimidyl-2' thio benzyl N-chlorophenyl acetamido) ethylbenzene
3,4-bis-(4',6'-diamino 5'-phenylpropyl pyrimidyl-2' beta-thio propanamido) isopropylbenzene
4,4'-bis-(4''-chlorobenzylamino 5''-chlorobutyl 6''-bromoethylamino pyrimidyl-2'' thio N-bromoethyl acetamido) diphenylmethane
2,4-bis-(4'-butylamino 5'-ethylchlorophenyl 6'-amino pyrimidyl-2' thio cyclopentenyl N-aminophenyl acetamido) 1-butyl naphthalene
Alpha, beta-bis-(4,6-diamino pyrimidyl-2 thio chloropropyl N-butylphenyl acetamido) phenylethane
Alpha, gamma-bis-(4,6-diamino pyrimidyl-2 thio N-xenyl actamido) phenylpropane
Alpha, alpha'-bis-(4,6-diamino pyrimidyl-2 beta'-thio beta''-isobutyl propanthionoamido) xylene It will be understood, of course, by those skilled in the art that, in those compounds listed above that are generically named, the diamino pyrimidyl thio alkylamido (or alkylthionoamido) substituents may be attached to any two positions in the hydrocarbon or halo-hydrocarbon nucleus. It also will be understood that the expression "diamino pyrimidyl" includes both the 4,6-diamino pyrimidyl-2 and the 2,6-diamino pyrimidyl-4 (2,4-diamino pyrimidyl-6) derivatives.

In a manner similar to that described above with particular reference to the diamino $$[(-NHR)_2]$$

pyrimidine (1,3-diazine) derivatives, corresponding derivatives of the 1,2-diazines and of the 1,4-diazines may be prepared. It also will be understood by those skilled in the art from the foregoing description of the preparation of compounds wherein there is only one thio linkage connecting the diazine nucleus with the alkylamido or alkylthionoamido grouping that similar compounds may be prepared in which there are two or three sulfur atoms connecting the diazine nucleus with two or three, respectively, alkylamido or alkylthionoamido groupings.

What I claim as new and desire to secure by Letters Patent of the United States is:

1. Chemical compounds corresponding to the general formula $$\left[ (RHN)_{\overline{1}} \left[ \begin{array}{c} R-C \\ -C \end{array} \begin{array}{c} C \\ N \\ C \\ N \end{array} \begin{array}{c} N \\ C- \end{array} \right] -S-C_nR_{2n}-\overset{Z}{\underset{\|}{C}}-NR- \right]_2 R$$

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

2. Chemical compounds as in claim 1 wherein R represents hydrogen.

3. Chemical compounds as in claim 1 wherein R represents hydrogen, Z represents a member of the class consisting of oxygen and sulfur, and $n$ is 1.

4. Chemical compounds corresponding to the general formula

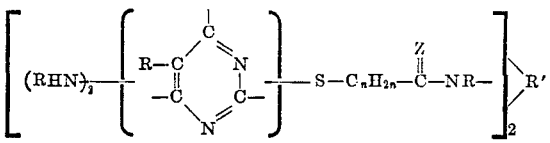

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

5. Chemical compounds corresponding to the general formula

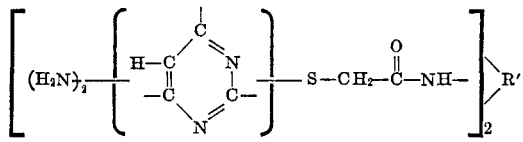

where R' represents a member of the class consisting of divalent hydrocarbon and halo-hydrocarbon radicals.

6. A bis-(diamino pyrimidyl thio acetamido)-substituted aliphatic hydrocarbon.

7. A bis-(diamino pyrimidyl thio acetamido) alkane.

8. An alpha, beta-bis-(diamino pyrimidyl thio acetamido) ethane.

9. Alpha, beta-bis-(4,6-diamino pyrimidyl-2 thio acetamido) ethane.

10. A bis-(diamio pyrimidyl thio acetamido)-substituted aromatic hydrocarbon.

11. A bis-(diamino pyrimidyl thio acetamido) benzene.

12. A bis-(diamino pyrimidyl thio acetamido) toluene.

13. The method of preparing chemical compounds corresponding to the general formula

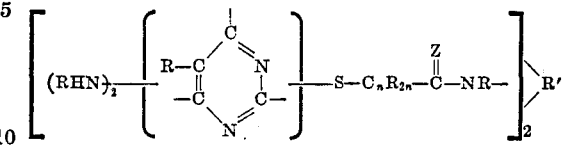

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals, said method comprising effecting reaction, in the presence of a hydrohalide acceptor, between (1) a mercapto pyrimidine corresponding to the general formula

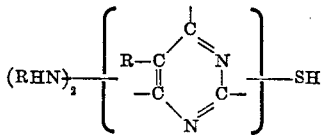

where R has the meaning above given, and (2) a compound corresponding to the general formula

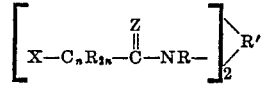

where X represents halogen, and $n$, Z, R and R' have the meanings above given, the components of (1) and (2) being employed in the molar ratios of at least two mols of the mercapto pyrimidine of (1) for each mol of the compound of (2).

14. A method as in claim 13 wherein the hydrohalide acceptor is an alkali-metal hydroxide.

15. A method of preparing alpha, beta-bis-(4,6-diamino pyrimidyl-2 thio acetamido) ethane which comprises effecting reaction, in the presence of a hydrohalide acceptor, between 2-mercapto 4,6-diamino pyrimidine and alpha, beta-bis-(chloroacetamido) ethane in the ratio of at least two mols of the former per mole of the latter.

GAETANO F. D'ALELIO.